United States Patent [19]

Nohejl

[11] 3,797,363

[45] Mar. 19, 1974

[54] TOOLS CARRYING HEADS, MORE PARTICULARLY FOR TRANSFER MACHINES

[75] Inventor: Antonin Nohejl, Surbiton, England

[73] Assignee: The Mollart Engineering Company Limited, Surrey, England

[22] Filed: Nov. 8, 1971

[21] Appl. No.: 196,711

[30] Foreign Application Priority Data

Nov. 16, 1970 Great Britain.................. 54,422/70

[52] U.S. Cl...................... 90/26 R, 29/39, 29/48.5, 29/65, 90/14, 408/35, 408/42
[51] Int. Cl............................................. B23b 39/16
[58] Field of Search .......... 408/35, 42; 90/11 R, 14; 29/39, 48.5, 65, 26 R, 26 A

[56] References Cited
UNITED STATES PATENTS

| 3,286,595 | 11/1966 | Wollenhaupt | 90/11 R |
| 3,564,943 | 2/1971 | Kavanagh | 408/35 |
| 3,413,702 | 12/1968 | Burg | 408/35 |
| 2,011,000 | 8/1935 | Kingsbury | 408/35 X |

*Primary Examiner*—Gil Weidenfeld
*Attorney, Agent, or Firm*—Davidson C. Miller

[57] ABSTRACT

A machine tool includes a tool carrying head which comprises at least two tool carrying units which are interchangeable from an operative position to an inoperative position in which the tools can be changed while the machine is still operating. The tool carrying units are mounted on a common pivot and are interchanged by a pivotal movement about a horizontal axis. The tool carrying unit in the operative position is engaged by a movable structure and is moved slidably forward from the common pivot to its final working position. The movable structure carries a drive motor for the tools carried by the operative unit.

13 Claims, 11 Drawing Figures

TOOLS CARRYING HEADS, MORE PARTICULARLY FOR TRANSFER MACHINES

This invention relates to tool carrying heads for machine tools.

Such machines have the disadvantage that if it is required to change the component being machined, it is necessary to have the whole machine out of operation while the necessary changes are made to the tools. The object of the present invention is to provide a tool carrying head for a machine tool having at least two tool carrying locations so as to enable tools to be changed or adjusted in one of the locations while the tools in the other location are capable of carrying out a machining operation. Thus, the machine can be set up for the next component to be machined while the machine is still in operation.

According to the present invention there is provided a tool carrying head for a machine tool, the head having at least two tool carrying locations and being pivotable to a first position in which a chosen one of said locations is placed in an operative position to enable a tool located therein to perform a machining operation, the other location being in an inoperative position in which tools may be removed therefrom or placed therein, the head being pivotable to a second position in which the chosen one of said locations is in the inoperative position and the said other location is in the operative position.

In one embodiment in accordance with the invention a tool carrying unit is removably provided at each location and the units are pivotally movable into said first operative position. In a preferred arrangement two units are provided each being removably mounted on a common pivot which is selectively rotatable about a horizontal axis. The pivot is supported by a stationary pivot holder mounted on a fixed base. The base preferably provides a slideway for a movable structure for engaging the unit in said first operative position and thereafter detaching said unit from said common pivot and advancing the unit through an operative range of movement or stroke. The movement of the slidable structure is obtained by means of a hydraulic cylinder mounted on the base. The tools carried by said unit are driven by a motor movable with said slidable structure.

In one preferred embodiment of the invention the tool carrying units are each preferably provided with a rotatable cam mounted externally of the unit and driven by the tool operating motor through a reduction gearing. The cam controls the movement of the unit through its operative range of movement or stroke and this control is conveniently obtained by operation of a one-way servo-valve by the cam for controlling the supply of pressure fluid to the hydraulic cylinder advancing the structure of the operative unit.

In a second preferred embodiment in accordance with the invention the unit in said first operative position is rapidly advanced by means of a lead screw rotated by an electric motor, the lead screw co-operating with a rotatable nut mounted on the slidable structure moving with the operative unit. After the initial advance of the operative unit by the rapid traverse motor, the motor is de-energised and the nut is then rotatable from the tool operating motor through gearing in the operative unit so as to provide the final range of movement of the operative unit.

Although in the preferred embodiments only two tool carrying units are provided it is, of course, within the scope of the invention to provide a head having three, four or even more tool carrying units.

The tool carrying heads in accordance with the present invention are primarily intended for use in single and double head machines, but can also be used with transfer machines or link line machines in which a number of work stations are provided, transfer means being provided to move the components from one station to the next until the components have passed successively through all work stations of the machine.

Such transfer machines may be in-line machines in which the work stations are spaced along a straight line, or rotary transfer machines in which the stations are spaced about a center, the components being located on a work-holding table which is rotatable about the center in a step-by-step fashion to being components on the table into alignment with successive stations.

The tool carrying heads in accordance with the invention may also be used for link-line machines which comprise a series of separate machines which may be standard production machines or milling machines, machines which are positioned contiguously along a line, transfer means, such as a conveyor, being provided to enable components being machined to be transferred from one machine to the next.

In the preferred embodiments of the invention the tools carried by the heads may be capable of performing one or more of the following operations: drilling, milling, boring, reaming, tapping, gun drilling, or grinding. The reference herein to the use of tools is intended to cover such tools capable of performing such operations.

The preferred embodiments of the invention will now be described by way of example with reference to the accompanying drawings in which.

Referring now to the drawings, and in particular FIGS. 1 to 4, the preferred embodiment of the invention consists of a tool carrying head 10 comprising a pair of separate tool carrying units 11 and 12 which are of box-like construction having a rectangular cross-section. The outer face 13 of each unit is adapted to receive suitable tools as indicated by the reference 14 in respect of unit 11 and the reference 15 in respect of unit 12.

The tool carrying units 11, 12 are removably mounted, as will be hereinafter described, on a common pivot member 16 which is connected to a shaft 17 rotatably supported by a stationary pivot holder 18 which is fixedly mounted at the upper end of an arm 19 extending upwardly from a fixed base member 20 of the machine.

Figure 1:
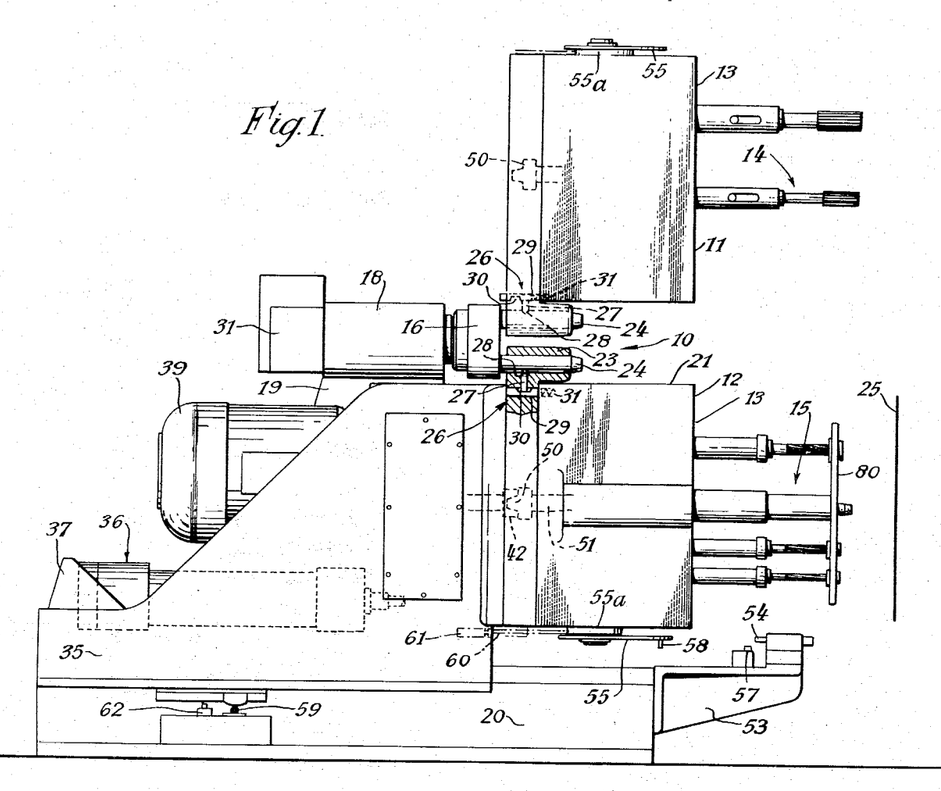
FIG. 1 is a side elevation partly in section of one embodiment of a machine in accordance with the invention.
Figure 2:
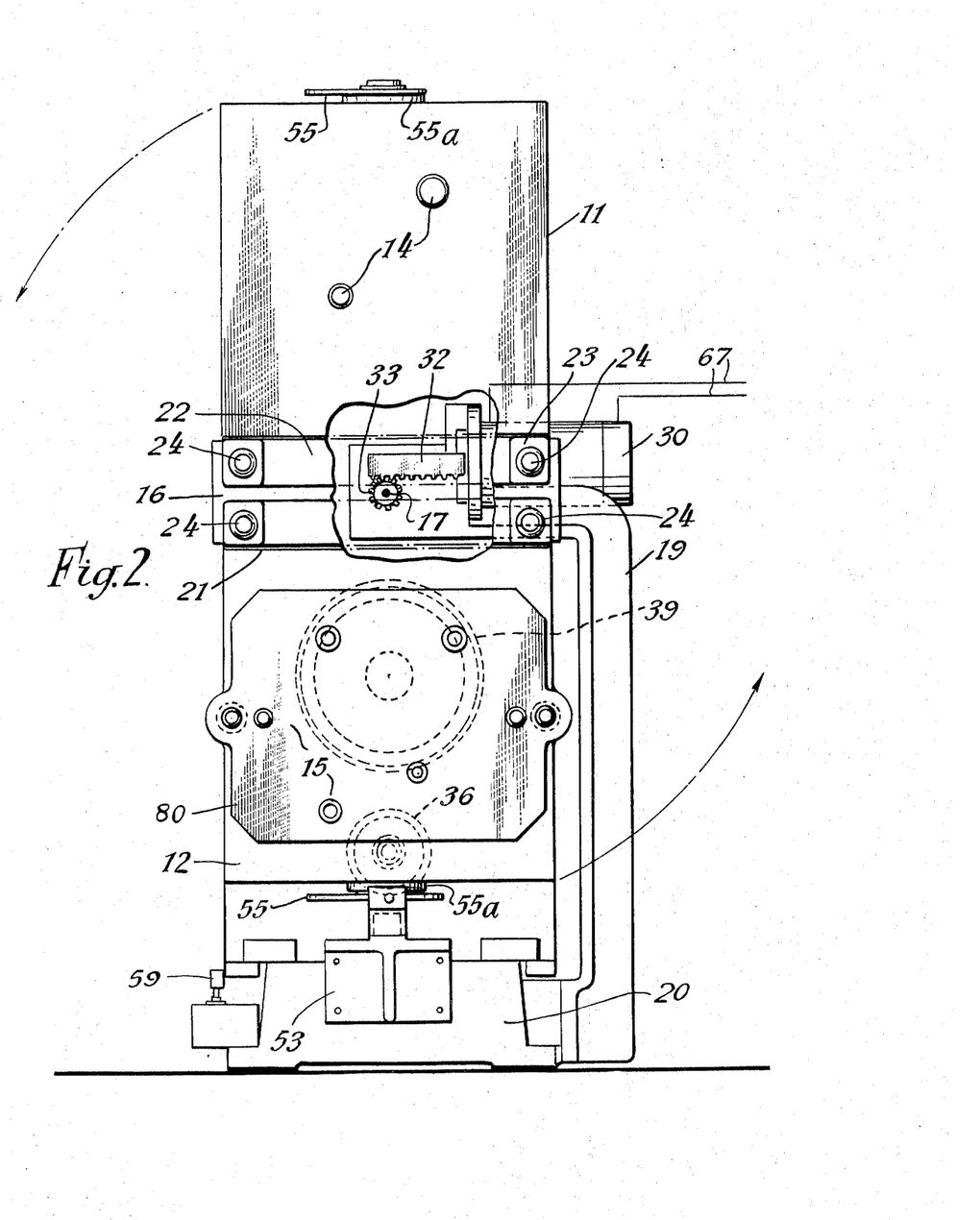
FIG. 2 is a front elevation of the machine taken from the right hand side of FIG. 1.

The tool carrying units 11, 12 are positioned diametrically on opposite sides of the axis of the shaft 17 so that rotation of the pivot member 16 through 180°, as will be hereinafter described, will interchange the positions of the units. In FIG. 1 the operative unit is the unit 12, the unit 11 being in an inoperative position in which the tools 14 can be changed or replaced while the machine is still operating by means of the unit 12.

The rear portion of one side face 21 of each of the units is formed with a projecting wall 22 provided at its ends with forwardly extending bosses 23 apertured to slidably receive pins 24 extending from the corners of the common pivot member 16 which is in the form of an elongated rectangular plate (see FIGS. 5 to 8).

The mounting of the units 11, 12 on the pins 24 of the common pivot member 16 provides for easy forward sliding movement of the units from the supporting pins. In the case of the upper unit 11 this enables the complete unit to be replaced, while in the case of the lower unit 12 the mounting permits the automatic forward movement of the unit to an operative position in which the tools 15 engage a workpiece or component indicated diagrammatically at 25 in FIG. 1.

The tool carrying units 11, 12 are each normally retained on their corresponding pins 24 by a releasable locking device 25. Any suitable locking device may be provided and in the drawings a simple mechanical arrangement is shown which comprises a locking pawl 27 mounted in the boss 23 and movable to engage an inclined cam groove 28 in the pin 24. The other end of pawl 27 is engaged by a slidable locking rod 29 which is formed also with an inclined cam groove 30 for receiving the other end of the pawl to permit disengagement of the pawl from the pin 24. Normally the locking rod 29 is urged by a spring 31 so that the other end of rod 29 projects from the rear face of the unit in the manner of a push button, in which position the rod acts to hold pawl 27 fixedly in the groove 28 of the pin 24. To release the inoperative unit 11 it is only necessary to depress manually the protruding end of rod 29. The release of the operative unit 12 is effected automatically as will be hereinafter described.

As previously mentioned, the interchange of the units 11 and 12 is effected by rotation of the shaft 17 of the common pivot member 16 and this movement is obtained by actuation of a hydraulically operated double-acting servo motor 30 (FIG. 8), the cylinder of which is connected to a fixed housing 31 containing a rack 32 which is connected to and linearly reciprocated by the piston of the motor. The housing 31 is fixed to pivot holder 18 and the shaft 17 extends into housing 31 and is provided therein with a pinion 33 drivably meshing with rack 32.

The fixed base member 20 is formed with a slideway 34 for receiving a movable structure 35 which is slidable along the slideway 34 by means of a hydraulically operated double-acting servo motor 36. The servo motor 36 comprises a cylinder-piston unit, the cylinder being fixedly mounted on a support frame 37 secured to the top of the fixed base member 20. The piston of the servo motor 36 is connected to the frame 38 of the movable structure 35 whereby actuation of the servo motor will move the structure 35 forwardly to engage the unit 12 as will be hereinafter described.

The movable structure 35 carries a drive motor 39 for operating the tools of the operative unit and other ancillary equipment carried thereby. The motor 39 is preferably a reversible electric induction motor and the frame 38 of the structure 35 includes suitable gearing 40 and a plurality of output shafts one of which is shown at 41, each being provided at its outer end with a coupling member 42 forming one part of a clutch unit.

The front face 43 of the frame 38 of the structure 35 is formed with apertures 44 which are adapted to receive locating pins 45 extending from the rear face of the tool carrying units 11 and 12. The frame furthermore includes a hydraulically operated servo motor 46 which, upon energization, is operable to pivot a pair of bell crank levers 47 to move locking members 48 into engagement with slots 49 in the pins 45 when they are located in the apertures 44. In this way the movable structure 35 can be moved slidably forward into engagement with the operative unit 12 and then locked thereto by actuation of the servo motor 46.

As the movable structure 35 slidably engages the rear face of the unit 12 under the operation of the servo motor 36 the coupling member 42 engages with a complementary coupling member 50 located within the rear face of the unit. The coupling member 50 forms the input member for a drive shaft 51 which is connected with the tools 15 by suitable gearing shown diagrammatically by the reference 52 in FIG. 4 of the drawings.

Figure 4:
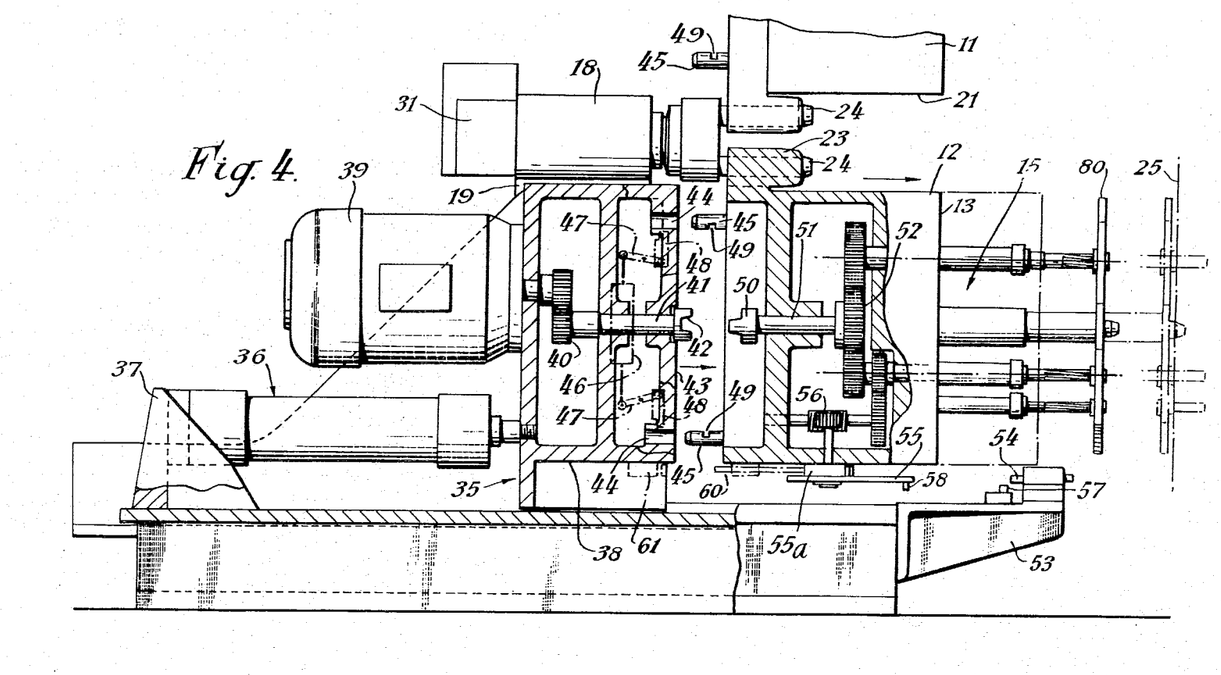
FIG. 4 is a diagrammatic side elevation, largely in section, through the lower tool carrying unit and operating structure of the machine.

The sequence of operation of the machine as now described is as follows, assuming the parts are in the position as indicated in FIG. 4 with the movable structure 35 fully retracted by the servo motor 36 along the slideway 34 of the fixed base member 20.

Figure 3:
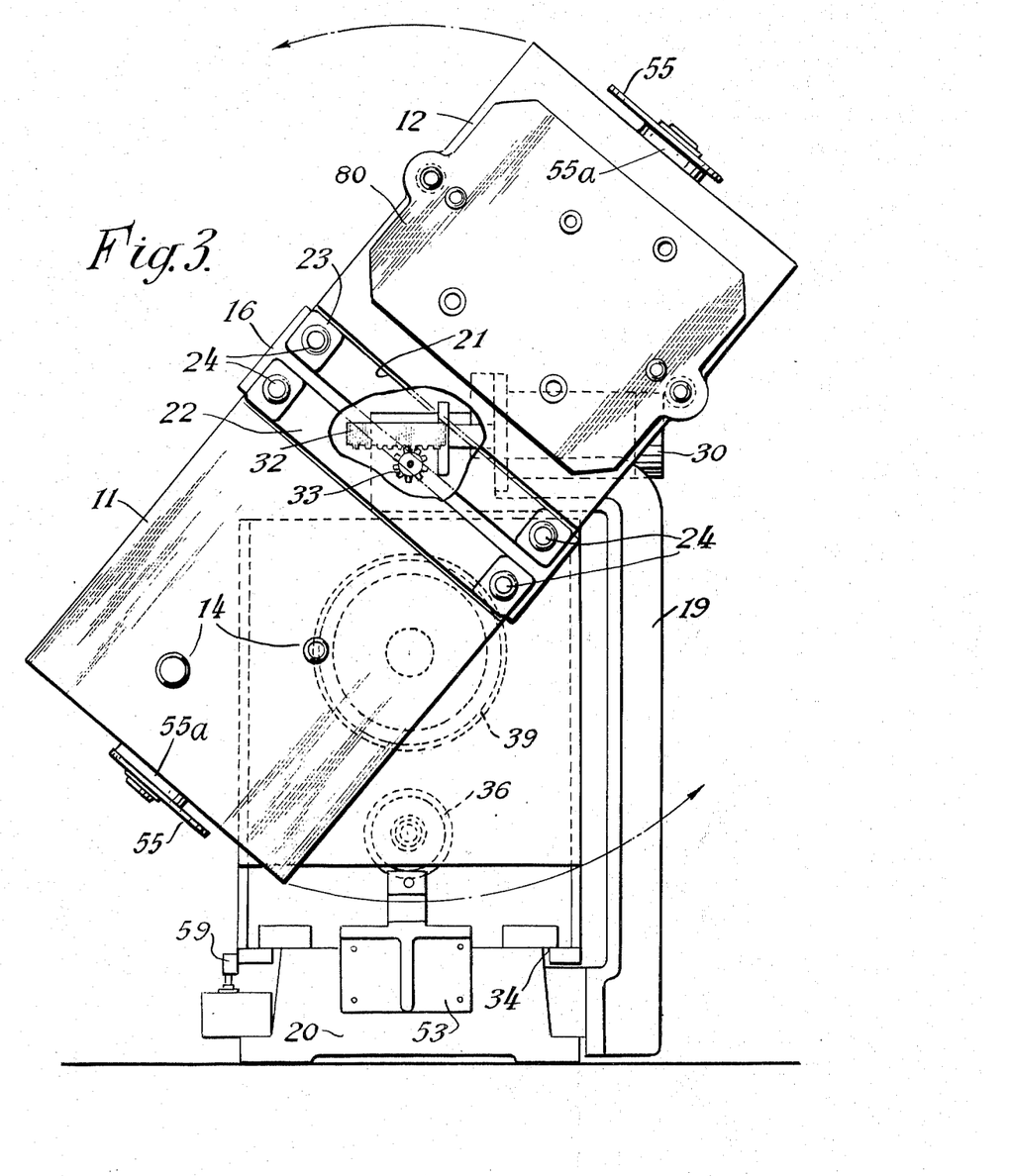
FIG. 3 is a front elevation of the machine similar to FIG. 2 but showing the upper tool carrying unit of FIG. 2 swinging into the lower operative position.

In the position of the parts of FIG. 4, the units 11 and 12 can be interchanged, if necessary, and if such a change is desirable the operator actuates the servo motor 30 to rotate the common pivot member 16 by means of the rack and pinion located in the housing 31. Movement of the rack to the left, as indicated in FIG. 3, rotates the units anti-clockwise, and it will be appreciated that the next interchange operation will result in opposite movement of the rack and, therefore, clockwise rotation of the units 11 and 12. During interchange of the units the releasable locking devices 26 maintain the units rigidly connected to their mounting pins 24 extending from the common pivot member 16. The interchange of the units is shown particularly in FIG. 8.

Figure 5:
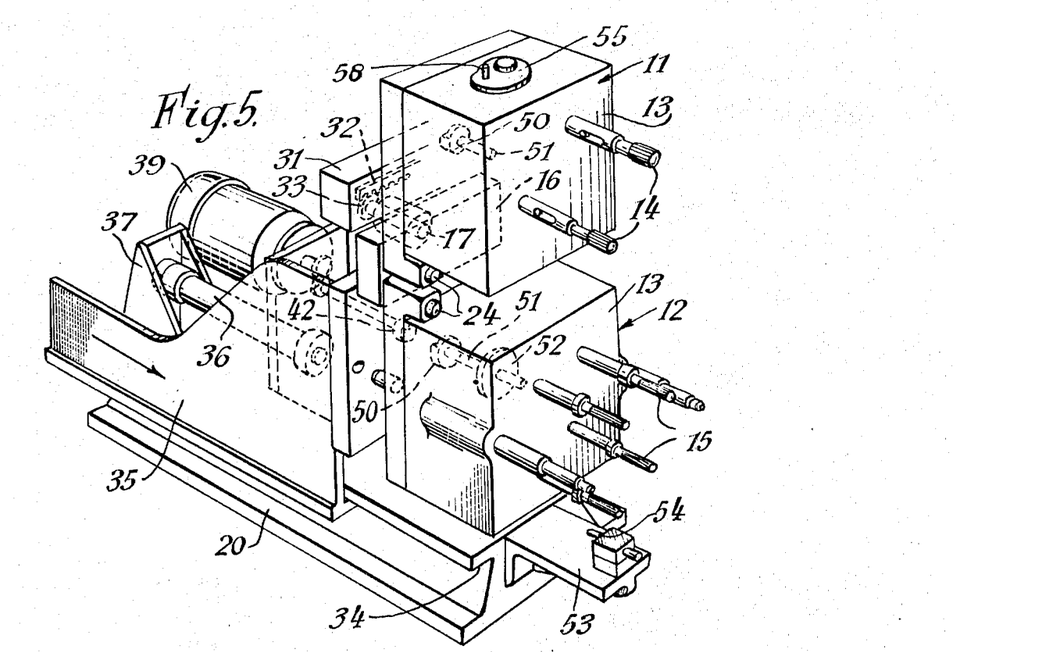
FIGS. 5 to 8 are diagrammatic perspective views showing steps in the cycle of operations of the tool carrying units of the machine.
Figure 6:
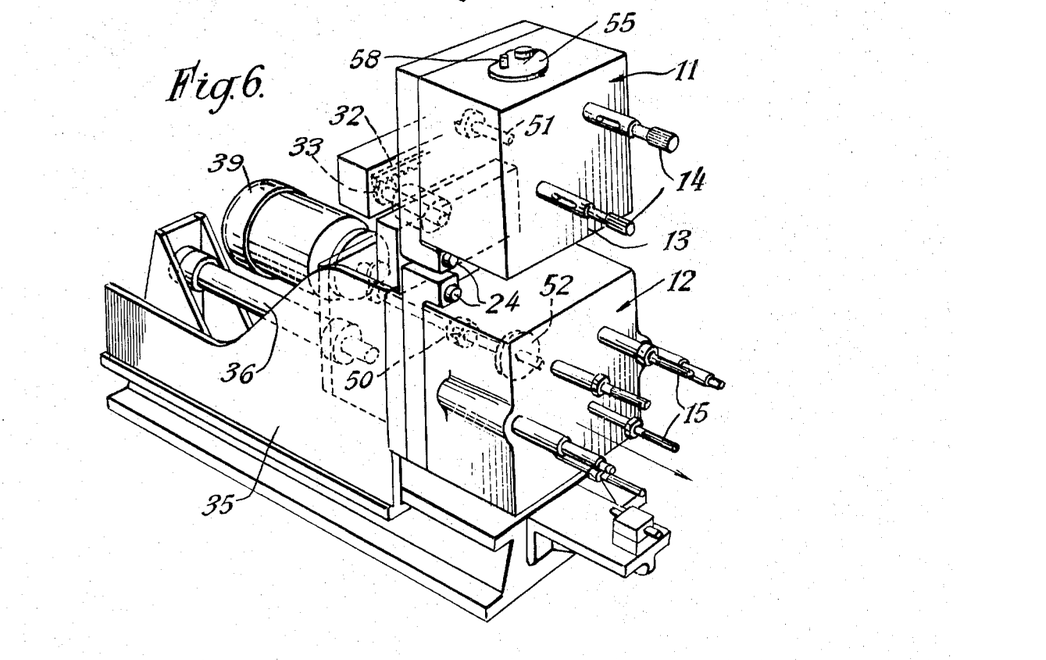

Assuming the unit 12 has been moved to the lower operative position, as shown in FIG. 4, the servo motor 30 is now de-energized and the operator now energizes the feed servo motor 36 to slidably move the structure 35 forwardly along the slideway 34 of fixed base member 20 (see FIG. 5). As the structure 35 moves into contact with the unit 12, as shown in FIG. 6, the locking pins 45 of the unit 12 are engaged in the apertures 44 of the structure 35 so as to lock the structure 35 and the unit 12 rigidly together under the control of the clamp cylinder 46 which is operated in sequence under the control of the operator. The engagement of the structure 35 with the unit 12 also has the effect of depressing the protruding end of the rod 29 of the releasable locking device 26 which thereby locates the groove 30 opposite the locking pawl 27.

Figure 7:
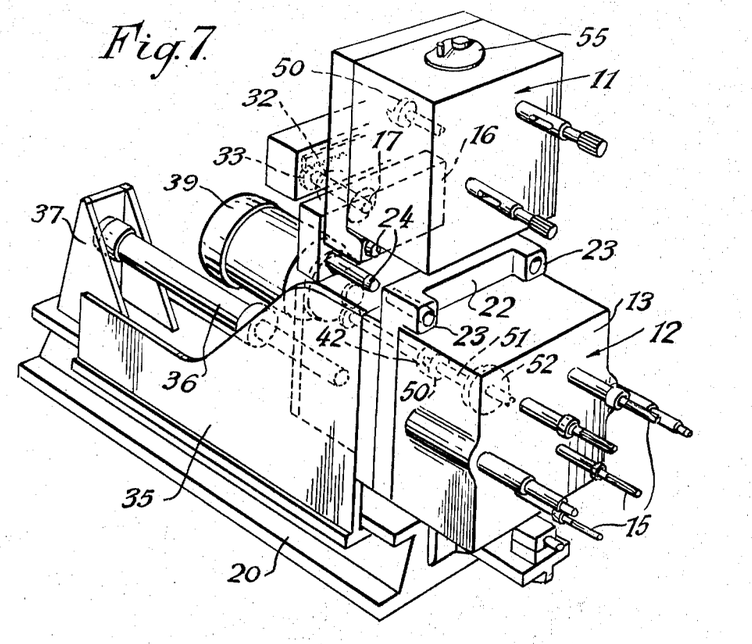
Figure 8:
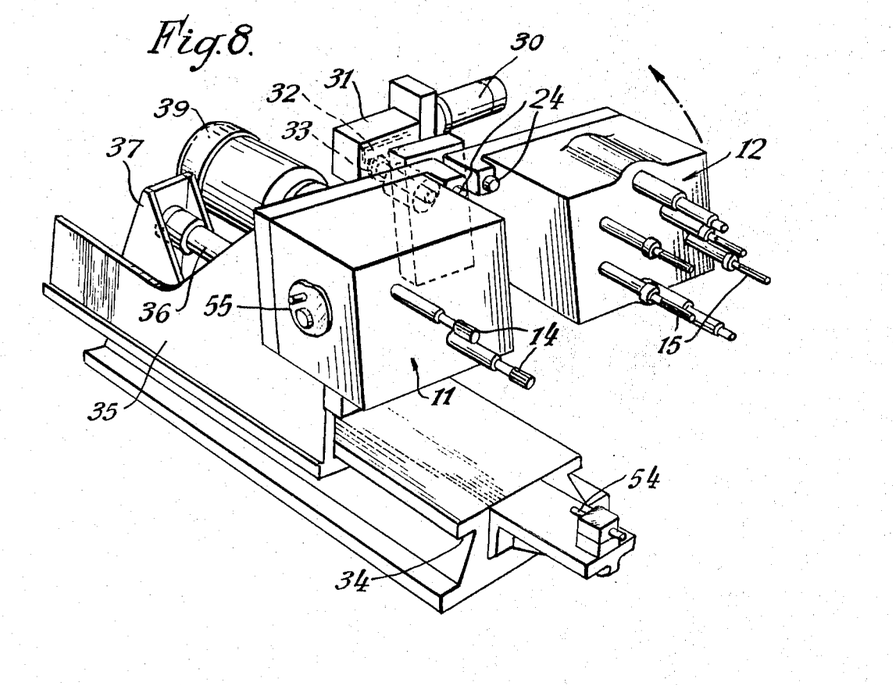

The further operation of the feed servo motor 36 now moves the combined structure forwardly along the slideway 34, as shown in FIG. 7, so as to move the tools 15 into an operative position as shown in chain lines in FIG. 4. In this position the unit 12 has moved forwardly away from the supporting pins 24 and in its final operative position the unit 12 is fully supported by the structure 35 on the slideway.

In the preferred embodiment of the invention the forward movement of the unit 12 and the supporting structure 35 continues until the pressure fluid supply is automatically cut off to the servo motor 36. To this end the fixed base 20 is provided with a bracket 53 which supports a servo valve 54 connected in the supply line for the pressure fluid to the feed servo motor 36. Each tool carrying head is provided with an abutment 55 on an appropriate external surface which is adapted to engage the servo valve 54 so as to close the valve to cut off the supply of pressure fluid as the combined assembly reaches its initial operative position.

Preferably, the abutment 55 comprises a rotatable cam member which is driven through reduction gearing 56 from the gearing system 52 in unit 12. It will be appreciated that upon engagement of the clutch parts 42 and 50 the drive motor 39 is energized to operate the tools 15 and thereby simultaneously the rotatable cam member 55. The cam member 55 preferably rotates through 360° through the operative range of movement of the unit during its actual machining operation. The cam member 55 can be provided with a contoured edge so that as the cam member rotates the position of the servo valve 54 is changed to allow, for example, further continuous and progressive advancement of the combined tool assembly including the tool carrying unit.

When the combined assembly has advanced to its final operative position, a limit switch 57 may be engaged by a projection 58 on the rotatable cam member 55, the switch 57 being operable to reverse the flow of pressure fluid to the double-acting servo motor 36, which thus provides a rapid return movement for the combined assembly along the slideway 34 on the fixed base member 20. The return movement may be controlled firstly by a limit switch 59 mounted on the side of the slideway 34 so as to de-energize motor 39 in the position of the parts shown in FIGS. 1 and 6 of the drawings. At this time cam section 55a has moved to actuate rod 60 on unit 12 to operate a control valve 61 on frame 38 to reverse the supply of pressure fluid to the clamp motor 46 so as to release the locking members 48 from the pins 49.

As the structure 35 continues to move rearwardly under the action of feed motor 36, the structure separates from unit 12 which is then locked automatically on support pins 24 of the common pivot member 16 by the locking device 26 as the rod 29 moves outwardly under the action of spring 31. Finally, the feed motor 36 is de-energized by operation of switch 62 with the parts in the position shown in FIGS. 4 and 5.

As a development of the invention, the rotatable cam 55 may be provided with trip members such as pins extending downwardly from its surface and positioned near the periphery so as to engage switches (not shown) reversing the pressure fluid flow to the hydraulic servomotor 36 advancing the combined assembly.

The purpose of this additional feature is to enable the partial withdrawal of the combined assembly at certain periods during the advance of the assembly during its operative stroke. Such retraction or partial retraction of the assembly is sometimes desirable, for example in wood-pecking operations. As the cam continues to rotate, the trip member passes the switch to allow the normal advance operation by the hydraulic servomotor until the next trip member angularly moves into position to provide a further reverse movement.

Figure 9:
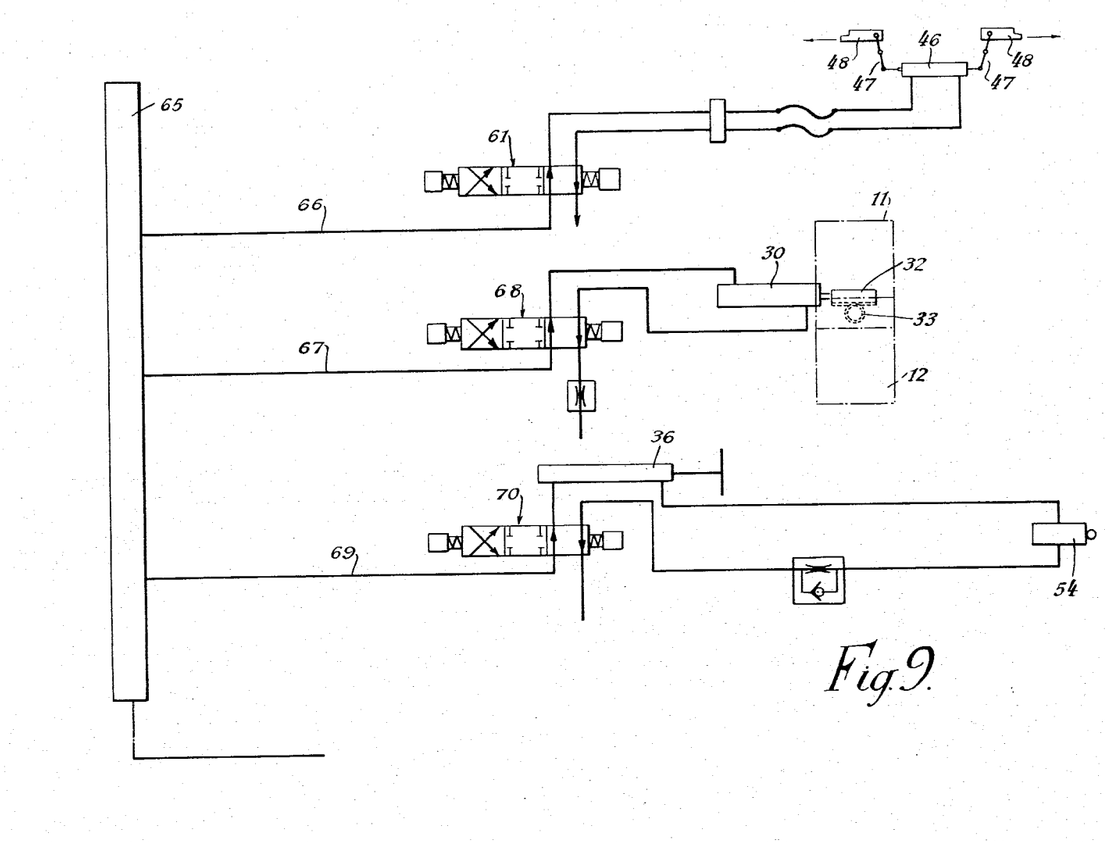
FIG. 9 illustrates the hydraulic control circuit of the machine.

A hydraulic pressure fluid control circuit for the servo motors 30, 36 and 46 is shown diagrammatically in FIG. 9. The pressure supply manifold 65 is connected to clamp motor 46 by supply line 65 under the control of the reversing valve 61 which is operable by the rod 60 upon rotation of the cam 55 when motor 39 is energized. The swing motor 30 is connected with the pressure manifold by supply line 67 through reversing valve 68 which is operator controlled. Finally, the feed motor 36 is connected to pressure manifold 65 by a supply line 69 through a reversing valve 70.

Figure 10:
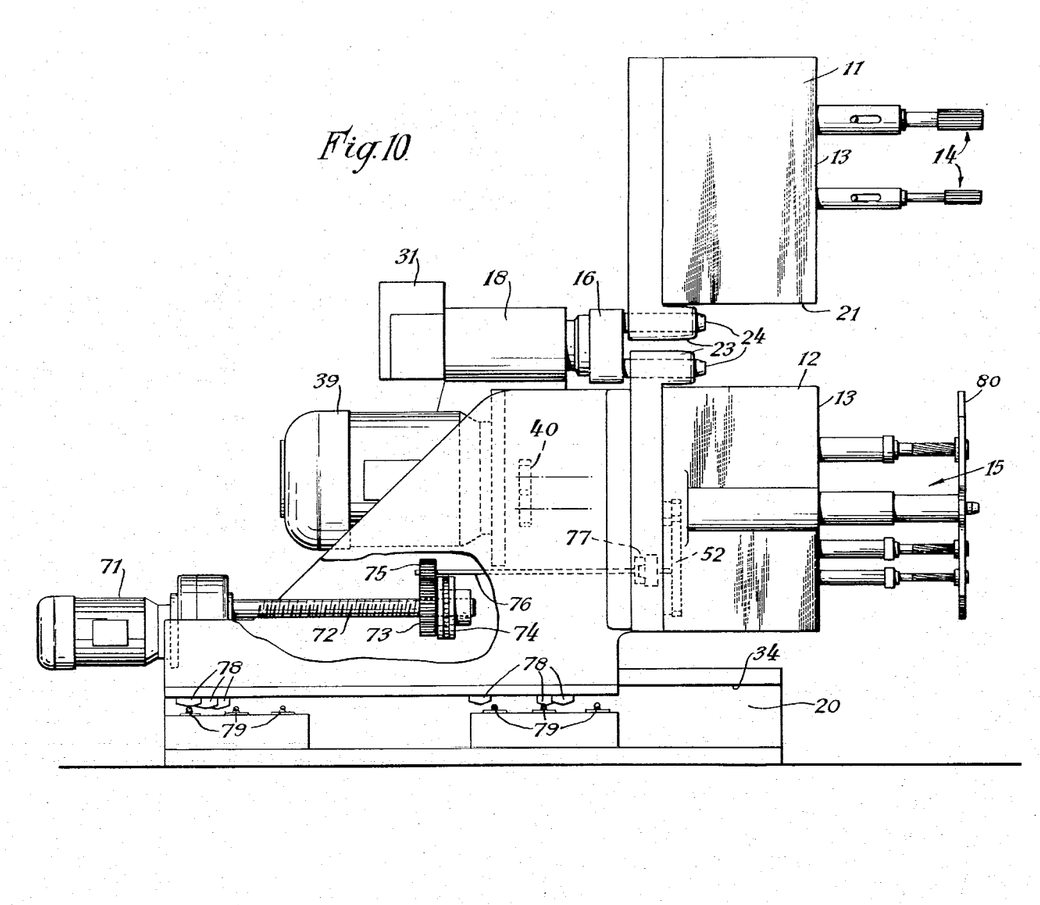
FIG. 10 is a side elevation partly in section of a modified embodiment of the invention.

A second embodiment of the invention is shown in FIG. 10 which is similar to the previous embodiment except that the initial advance of the combined assembly of the movable structure 35 and the operative tool carrying unit 12 is obtained on the slideway 34 provided by the fixed base 20 by means of a rapid traverse motor 71 which is preferably an electric motor of any conventional design. The motor 71 is mounted on the base member 20 and drives an elongated lead screw 72 which co-operates with a nut member 73. The nut member 73 is rotatably supported by a bearing unit 74 on the movable structure 35 and is externally threaded as shown for driving engagement with a pinion 75 carried by a shaft 76. The shaft 76 is rotatably driven through a clutch unit 77 from reduction gearing 52 mounted within the tool carrying unit 12 and which is drivably connected with the drive motor 39 for the tools 15 carried by the unit.

During the rapid advance of the combined assembly to the initial machining position, the drive motor 39 is de-energized and consequently the rotatable nut 75 is fixedly held against rotation. Rotation of the lead screw 72 by the rapid traverse motor 71 thereby axially moves the rotatable nut 73 along the lead screw 72 to advance the combined assembly. This movement continues until the rapid traverse motor 71 is de-energized by trip or limit switches 78 mounted on the movable structure and which operate switches 79 carried by the fixed base 20. Upon de-energization of the rapid traverse motor 71 the drive motor 39 for the tools 15 is automatically energized and this simultaneously rotates the rotatable nut 75 mounted on the lead screw 72 which is now fixed due to de-energization of the rapid traverse motor 71. A slower more controlled advance of the combined assembly is thereby obtained from the drive motor 39 and this movement continues until the drive motor is de-energized by suitably positioned trip or limit switches. The slower advance of the combined assembly by motor 39 is effected through the gearing 52 of unit 12 and it will be appreciated that by changing units having different gearing selected speeds can be obtained by engagement with the different output shafts 41. Reverse switches may also be provided to effect the return movement of the combined assembly which is preferably obtained by reverse operation of the rapid traverse motor 71, thus providing a quick return movement.

In this embodiment trip switches operate to reverse the control valve to disconnect the locking member to release the movable structure 35 from the tool carrying unit 12 so that as the movable structure 35 moves away from unit 12 it is locked as before to the pins 24 of the common pivot 16.

It will be appreciated that the separate machining units can be easily removed when in the inoperative or second location to enable different types of units containing different work-holding spindles to be provided. Each machining unit may also carry a fixture locating device which comprises a plate 80 located relative to the particular tools carried by the unit, the plate having locating bores which are arranged to engage with corresponding bores in the component to be machined to thereby locate the component accurately with respect to the maching tools carried by the unit. The plate may also be provided with locating pins or projections.

The tool carrying head of the invention may be mounted in any desired position, but it is envisaged that it will be normally used with the tool spindles horizontally or vertically disposed.

The use of a rotatable tool carrying head with a transfer machine enables the economic advantages of a transfer machine to be obtained, but with the additional flexibility of being able to adjust the tools carried by the machine to machine a different component while the machine is still in operation and to be able to rapidly change the machine from a condition suitable for machining one component to a condition suitable for machining another.

It is also envisaged that, particularly when the tool carrying heads are used with a rotary transfer machine, the head may be used to double the number of machining operations which may be carried on a particular machine. Thus, for example, with a rotary transfer machine having six working stations, the use of the rotatable tool carrying heads at each station would enable the machine to perform twelve distinct operations. A control arrangement could be provided to automatically move the head from its first position to its second position after the machining cycle of the tool at the first location.

Figure 11:
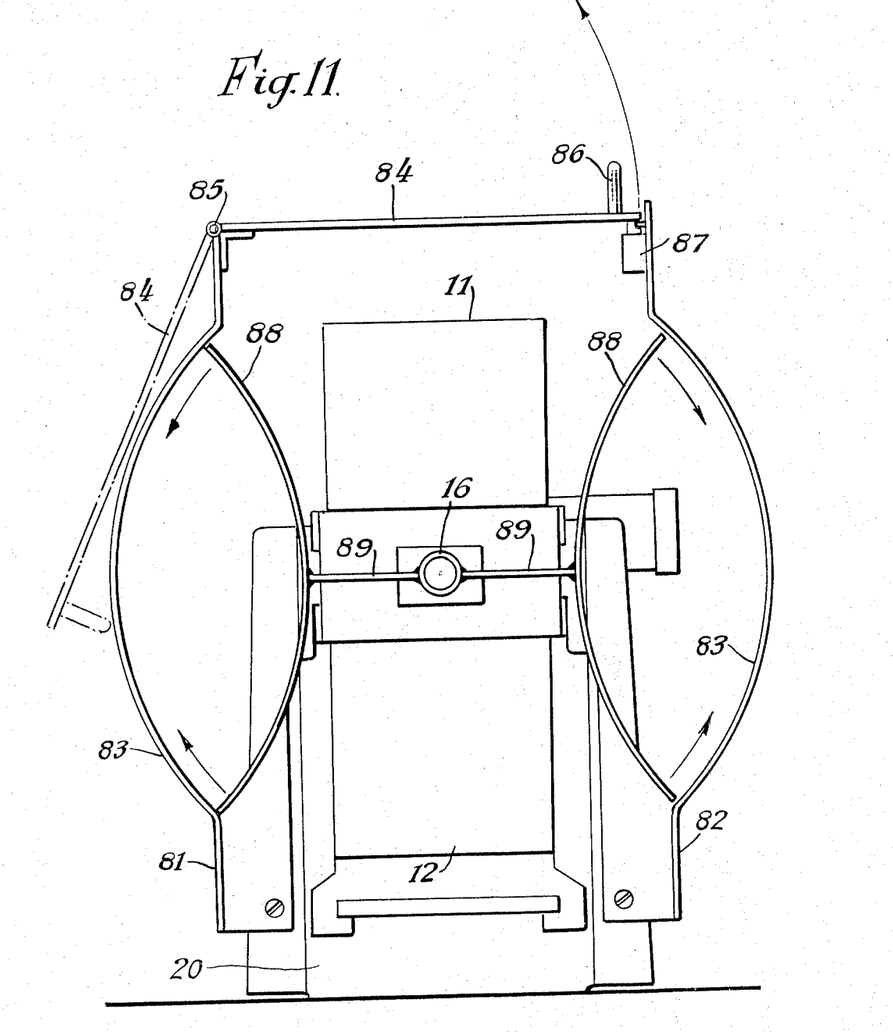
FIG. 11 illustrates suitable safety guards for the machine.

Referring now to FIG. 11, there is shown diametrically an arrangement of safety guards for the embodiments of the machine previously described. At each side of the machine fixed guards 81, 82 are rigidly attached to the fixed base 20, each guard having a protruding curved section 83 to allow for the swinging movement of the units 11, 12 as they are interchanged. The top of the guard 81 is provided with a top guard 84 which is hingedly secured thereto at 85, the guard being provided with a handle 86 so that the guard can be moved to the chain line position to provide ready access to the machine. The guard 84 is adapted to engage a switch 87 carried by the fixed guard 82, the switch 87 being located in the power circuit so that the machine is rendered inoperative until the guard 84 is properly closed, as shown in full lines in the Figure. A pair of curved safety guards 88 are attached to horizontal plates 89 secured to the common pivot member 16 for rotation with the units 11, 12, the guards 88 moving within the protruding portions 83 of the fixed guards as the units are interchanged.

I claim:

1. A machine tool comprising a frame having a horizontal slideway, at least two tool carrying units mounted about a common pivot member, means for rotating said pivot member about a horizontal axis for angularly moving said tool units about said axis from an inoperative position to an operative position above said slideway or vice versa, a movable structure slidably mounted on said slideway, means for actuating said movable structure along said slideway to engage the tool carrying unit positioned in said operative position, means for interconnecting said movable structure and said tool carrying unit in said operative position, said actuating means thereafter moving said interconnected movable structure and tool carrying unit along said slideway to detach said tool carrying unit from said pivot member and to move said unit to a working position, and drive means on said movable structure for driving the tools on said unit in said working position for performing a machining operation.

2. A machine tool as claimed in claim 1, wherein the common pivot is supported by a stationary pivot holder mounted on said frame of the machine, said pivot being rotatable by a selectively operable first servo motor through a rack and pinion mechanism.

3. A machine tool as claimed in claim 2, wherein each tool carrying unit is slidably mounted on pins projecting horizontally from said common pivot, each unit including releasable first locking means for fixedly mounting said units on the corresponding pins.

4. A machine tool as claimed in claim 3 wherein, said movable structure is slidable under the control of a selectively operable second servo motor mounted on said frame.

5. A machine tool as claimed in claim 4, wherein said releasable locking means on the tool carrying unit located in said first operative position is operable by said movable structure upon engagement of said structure with said tool carrying unit so as to release said unit from said pins projecting from said common pivot.

6. A machine tool as claimed in claim 5, wherein said drive means for said tools is operable to drive said tools upon engagement of said movable structure with said unit.

7. A machine tool as claimed in claim 6, wherein said movable structure includes second locking means for securing said tool carrying unit in said operative position to said movable structure, and wherein said secured movable structure and tool carrying unit are movable along said slideway to a working position under the control of said second servo motor.

8. A machine tool as claimed in claim 7, wherein each tool carrying unit is provided with cam means for de-energizing the power supply to said second servo motor when said secured movable structure and tool carrying unit have advanced through an operative range of movement.

9. A machine tool as claimed in claim 8, wherein the cam means is rotatable by said drive means mounted on said movable structure and said cam means is contoured for engaging servo means for controlling the operation of said second servo motor for varying the advancement of the secured movable structure and tool unit by said second servo motor.

10. A machine tool as claimed in claim 1 further comprising guard members fixedly secured to said frame at each side thereof, each guard having a curved outwardly protruding section to allow for the pivotal swing movement of the tool carrying units when said units are interchanged, said guards also supporting a pivotal top guard movable for access to the machine and controlling operation of the machine by engagement with a limit switch when in a closed position.

11. A machine tool as claimed in claim 10 having safety guards attached to the common pivot and pivotally movable with the curved protruding sections of said fixed guards.

12. A machine tool as claimed in claim 1 having a rapid traverse motor for said tool carrying unit in said first operative position, said rapid traverse motor driving a long lead screw, a rotatable nut mounted on said lead screw and supported by said movable structure slidable on the frame of said machine, said nut being in threaded engagement with a pinion drivably connected to said drive means for said tools carried by said unit in said first operative position, said drive means being carried by said movable structure and said rapid traverse motor being mounted on said frame.

13. A machine tool as claimed in claim 12, wherein said drive means is connected with said pinion through gearing in said operative unit and said drive means is connected with a plurality of output shafts selectively engageable with a selected gearing in said unit so as to provide a desired output speed for said pinion.

\* \* \* \* \*